US005922953A

United States Patent [19]

Payne et al.

[11] Patent Number: 5,922,953

[45] Date of Patent: *Jul. 13, 1999

[54] SENSOR APPARATUS WITH SELF-ADJUSTING MECHANISM FOR MINIMIZING AIRGAP

[75] Inventors: Donald W. Payne, Anaheim; Seved Ahmad Mojahed Gomnam, Irvine; Adam Whittingham, Orange; Joseph L. Jonke, Anaheim, all of Calif.

[73] Assignee: Magnetic Sensors Corporation, Anaheim, Calif.

[ * ] Notice: This patent issued on a continued prosecution application filed under 37 CFR 1.53(d), and is subject to the twenty year patent term provisions of 35 U.S.C. 154(a)(2).

[21] Appl. No.: 08/938,953

[22] Filed: Sep. 25, 1997

[51] Int. Cl.[6] .................... H02K 19/24

[52] U.S. Cl. .................... 73/494

[58] Field of Search .................... 73/866.5, 473, 73/494, 514.39; 324/202, 207.11, 207.2, 207.25, 207.26, 173–175

[56] References Cited

U.S. PATENT DOCUMENTS 4,078,185 3/1978 Singbartl .
4,612,501 9/1986 Castello et al. .................... 324/207.25
5,115,186 5/1992 Reinartz et al. .................... 324/207.26
5,195,831 3/1993 Faye et al. .................... 324/207.25

FOREIGN PATENT DOCUMENTS 2 928 610 2/1981 Germany .................... 324/173
005 5760 4/1983 Japan .................... 324/173

*Primary Examiner*—Robert Raevis
*Attorney, Agent, or Firm*—Arthur Freilich; Robert Hornbaker; Leon Rosen

[57] ABSTRACT

An apparatus useful for detecting the speed and/or position of an object moving along a defined path and more particularly to such an apparatus configured to minimize the spacing between a sensing face of the apparatus and a target surface on the object. Embodiments of the invention are particularly suited for sensing the speed of a rotating member, e.g., a gear, by utilizing a sensor, such as a Hall-effect sensor, to detect the movement of each gear tooth past the sensor. An apparatus in accordance with the invention is configured to mount the sensor for adjustable positioning along a sensor path between an initial position and a final operational position. Movement of the sensor along the sensor path is restricted, e.g., by frictional engagement, but can be overcome by contact with the target surface so as to move the sensor to its final position with the spacing, i.e., airgap between the sensing face and the target surface, minimized.

9 Claims, 3 Drawing Sheets

SENSOR APPARATUS WITH SELF-ADJUSTING MECHANISM FOR MINIMIZING AIRGAP

BACKGROUND OF THE INVENTION

Devices for sensing the speed of a rotating member are well known (see, e.g., U.S. Pat. No. 4,970,463 which describes Hall-effect sensors used to detect the teeth or notches on rotating ferrous wheels, e.g., gears). In such devices, the length of the airgap (the spacing between the sensor and the passing ferrous teeth) must be sufficiently small to assure reliable detection of each passing tooth. The precise length of the airgap may be difficult to establish when, for example, there is a large tolerance stackup or when interchangeability of sensors is a requirement. Moreover, in many installations the airgap is blind or hidden and hence it may be difficult, expensive, and impractical to precisely measure.

SUMMARY OF THE INVENTION

The present invention is directed to an apparatus useful for detecting the speed and/or position of an object moving along a defined path and more particularly to such an apparatus configured to minimize the spacing between a sensing face of the apparatus and a target surface on the object.

Embodiments of the invention are particularly suited for sensing the speed of a rotating member, e.g., a gear, by utilizing a sensor, such as a Hall-effect sensor, to detect the movement of each gear tooth past the sensor. An apparatus in accordance with the invention is configured to mount the sensor for adjustable positioning along a sensor path between an initial position and a final operational position. Movement of the sensor along the sensor path is restricted, e.g., by frictional engagement, but can be overcome by contact with the target surface so as to move the sensor to its final position with the spacing, i.e., airgap between the sensing face and the target surface, minimized.

A preferred sensor apparatus in accordance with the invention, useful for sensing the speed of a target surface moving along a defined target path, comprises 1) a support structure, 2) a sensor housing, 3) means for mounting the sensor housing on the support structure for movement along a defined sensor path between an initial position and a final operational position, 4) means for restricting movement of the sensor housing along the sensor path, and 5) means for mounting the support structure proximate to the target path for enabling the target surface to engage the sensor housing to adjust its position along the sensor path.

In a preferred embodiment of the invention, the sensor comprises a magnetic sensor, such as a Hall-effect or a variable reluctance sensor, suitable for detecting discontinuities, e.g., gear teeth, along a target surface formed of ferrous material.

A preferred method in accordance with the invention for minimizing an airgap between a sensor and a moveable target surface, wherein the sensor is comprised of a support structure and a sensor housing configured for movement relative to the support structure along a defined sensor path between an initial position and an operational position, comprises the steps of 1) positioning the sensor housing proximate to the target surface, 2) applying a first installation force to the support structure to engage the sensor housing against the target surface to move the sensor housing from an initial position to a coarse operational position, and 3) moving the target surface to thereby apply a second installation force to the sensor housing to move the sensor housing from the coarse operational position to a final operational position.

The novel features of the invention are set forth with particularity in the appended claims. The invention will be best understood from the following description when read in conjunction with the accompanying drawings.

DESCRIPTION OF THE PREFERRED EMBODIMENTS

Figure 1:
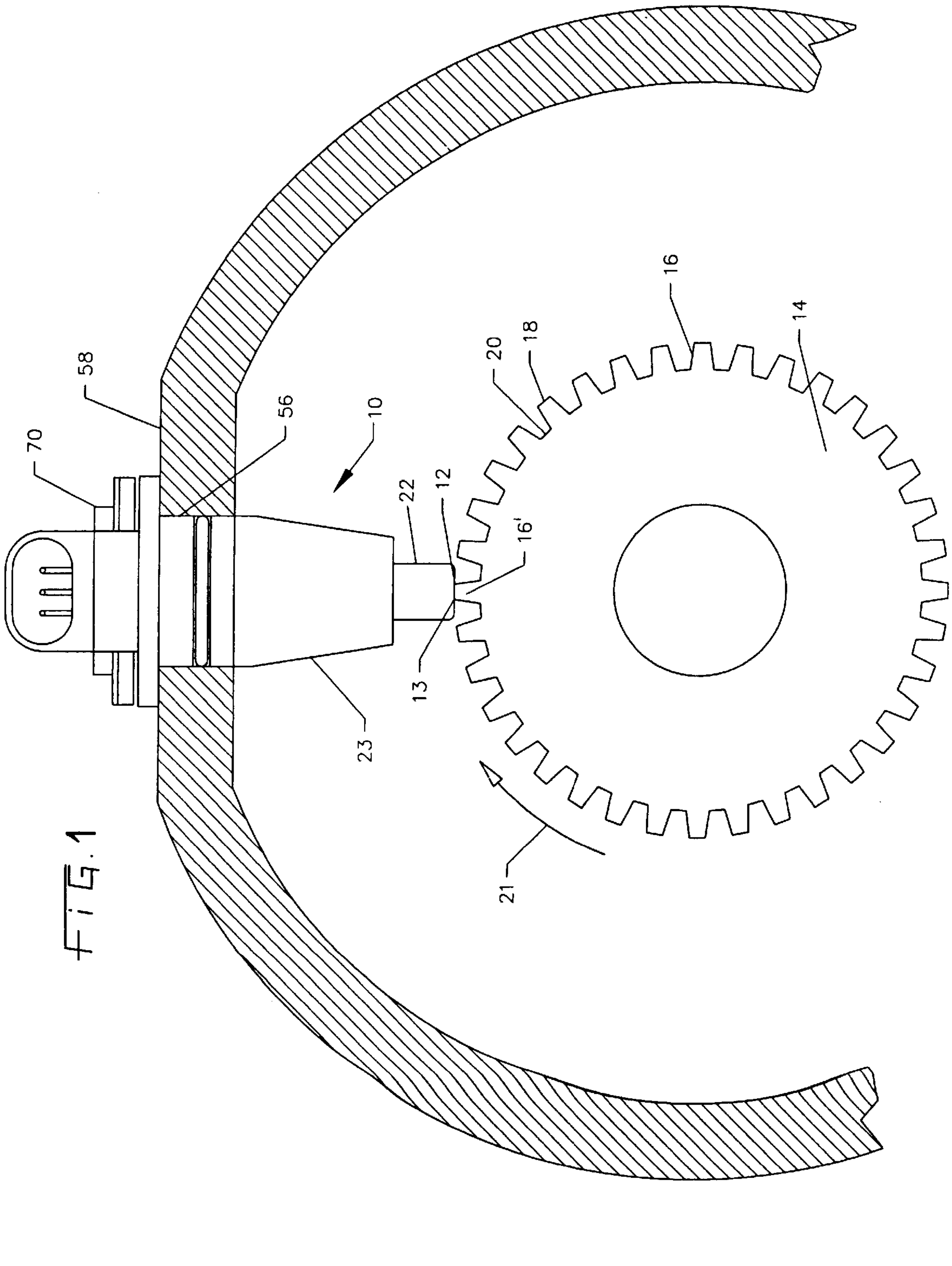
FIG. 1 is a side view of a preferred sensor mounted on a mounting surface and showing the relationship of its sensing face to the target surface of a rotating member, i.e., a gear.

The present invention is directed to a sensor assembly 10, e.g., a speed sensor, configured to automatically adjust the spacing, i.e., the airgap, between the sensor assembly's sensing face 12 and a surface 13 of a moving target 14, e.g., a gear or splines (see FIG. 1). In a preferred application the target 14 is a rotating member, e.g., a gear, having ferrous teeth 16 that are magnetically detectable by the sensor assembly 10 as peaks 18, i.e., the target surface 13, and valleys 20 of the teeth 16 move past the sensor assembly 10 along a target path 21. The sensor assembly 10 includes self-adjusting means, described below, for minimizing the spacing between the sensing face 12 and the target surface 13 to simplify installation and improve the sensing reliability.

Figure 2:
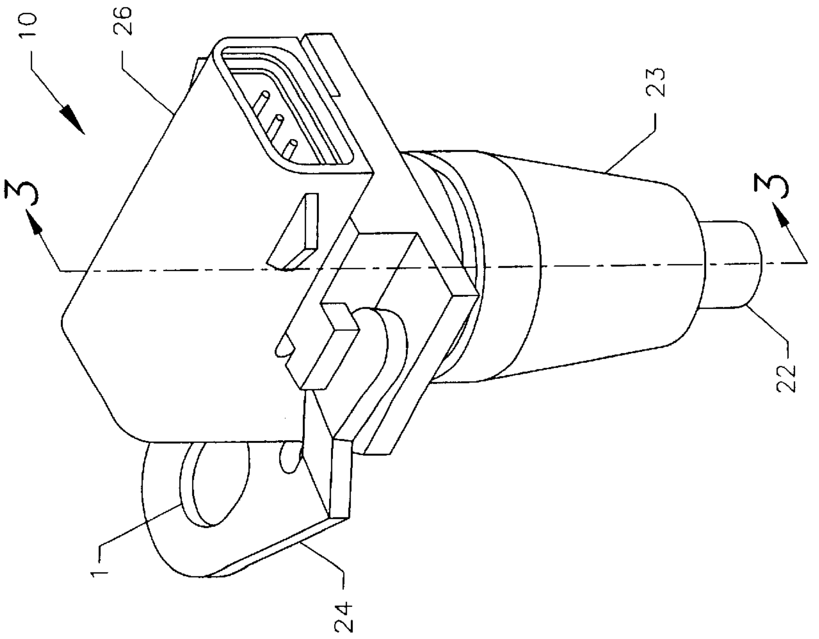
FIG. 2 is a perspective view of a Hall-effect sensor in accordance with the principles of the present invention and further showing a submersible connector for attachment of electrical connections to the Hall-effect sensor.

FIG. 2 shows a preferred sensor assembly 10, in accordance with the principles of the present invention, primarily comprised of 1) a sensor housing 22, 2) a support structure 23, 3) a mounting bracket 24, preferably attached as an integral part to the support structure 23, and 3) an electrical connector 26.

Figure 5:
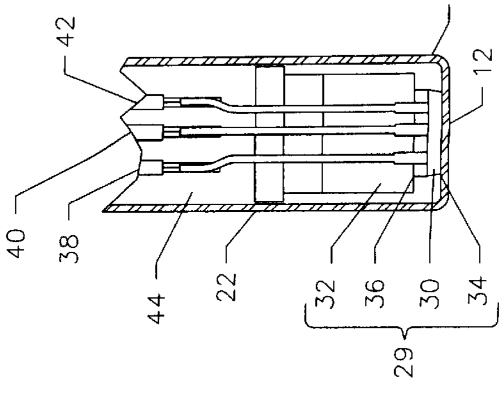
FIG. 5 is an enlarged vertical sectional view of the Hall-effect sensor assembly of FIGS. 2–4, taken along line 4—4, showing the details of the sensor housing.

FIG. 5 shows a sensor housing 22 primarily comprised of a can 28 which supports the sensor components 29, primarily a Hall-effect sensor 30 and a magnet 32. This can 28 is preferably sealed to protect the sensor components 29 against any damaging effects of liquids or gases and against any abrasion that might occur due to contact with abrasive materials, such as rotating members or metal particles. The can 28 is preferably formed of nonmagnetic material, e.g., austenitic stainless steel, aluminum, copper, or plastic, to avoid effecting the performance of the Hall-effect sensor 30.

In an exemplary embodiment of the invention, the Hall-effect sensor 30, e.g., Allegro MicroSystems part number A3056EU, is permanently attached to the bottom of the can 28 by means of an adhesive 34, e.g., epoxy, cyanoacrylate ester, or other commercially available adhesives. The Hall-effect sensor 30 responds to perturbations in magnetic field intensity and consequently the sensor's output signal is a function of the variations in magnetic field intensity at the face of the sensor 30, i.e., the sensing face 12. The magnet 32 is permanently attached to the opposing side of the Hall-effect sensor 30 as shown in FIG. 5 by means of an adhesive 36, e.g., epoxy or cyanoacrylate ester. Three insulated, copper conductors 38, 40, and 42 are attached to the three leads of the Hall-effect sensor 30. The Hall-effect sensor 30, magnet 32, and the adjacent portions of the insulated conductors 38, 40, and 42 are preferably encapsulated into the can 28 by an encapsulating compound 44, e.g., epoxy or room-temperature-vulcanizing compound (widely known as RTV compound).

The operation principles of Hall-effect sensors such as those shown in FIG. 5 are widely known. The key feature of Hall-effect sensor 30 is that its output signal varies in response to the passing of a ferrous member, e.g., gear teeth 16, in close proximity to the Hall-effect sensor 30. Inasmuch as the magnetic field intensity must vary between prescribed limits (as small as ±7.5 gauss to as much as ±250 gauss for the Allegro Microsystems part number A3056EU), the separation between the Hall-effect sensor 30 and the passing gear teeth 16 must be small for reliable detection of each passing tooth 16.

In accordance with the invention, the sensor housing 22 is mounted for movement along a guideway relative to the support structure 23. In the exemplary embodiment shown in FIG. 3, the sensor housing 22 (having axis 45) is coaxially positioned in a chamber 46, i.e., a guideway, to permit relative linear movement along axis 45, i.e., a sensor path. The sensor housing 22 is preferably held in position along the sensor path by means of an interior O-ring 48 which frictionally engages the exterior surface of the sensor housing 22. The sensor housing 22 may alternatively or additionally be held in position along the sensor path by means of frictionally engaged ribs or ridges 50 shown in FIGS. 3 and 6. The O-ring 48 and/or ribs or ridges 50 are designed, in an exemplary embodiment, so as to retain the sensor housing 22 in place against an axial force on the order of 20±10 pounds.

Figure 4:
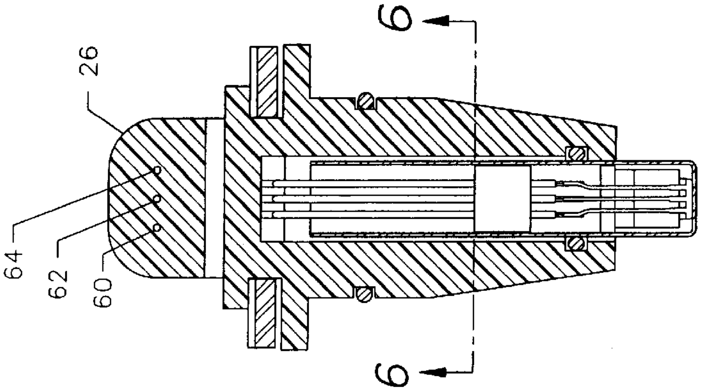
FIG. 4 is a sectional view of the sensor of FIG. 3 taken along line 4—4.
Figure 3:
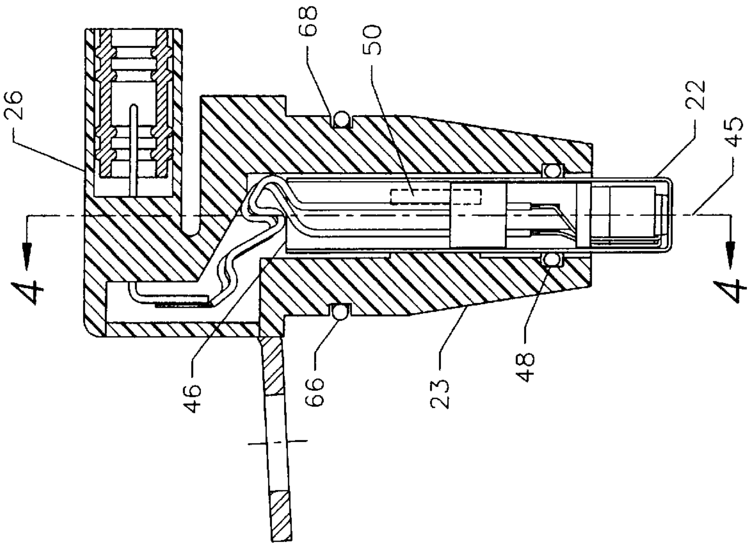
FIG. 3 is a vertical sectional view of the sensor of FIG. 2 taken along line 3—3.
Figure 6:
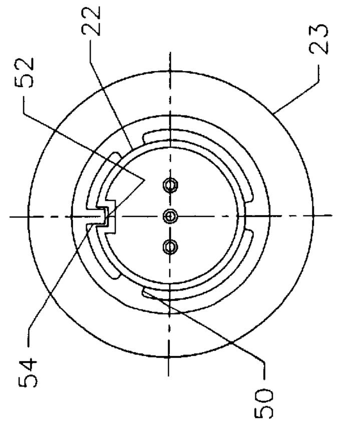
FIG. 6 is a horizontal sectional view of the sensor of FIG. 4, taken along line 6—6, showing the keyway and guide that ensures proper angular orientation.

FIG. 6 comprises a horizontal sectional view of the sensor of FIG. 3 and FIG. 4 showing groove 52 and guide 54 form a means to retain the sensor housing 22 in the desired angular position with respect to the mounting bracket 24.

Referring again to FIGS. 3 and 4, the unencapsulated ends of insulated conductors 38, 40, and 42 are connected to pins 60, 62, and 64 in the connector 26. Accordingly, connector 26 provides a means for supplying electrical power to the sensor 30 and a means for retrieving an output signal from the sensor assembly 10 as the sensor 30 responds to perturbations in magnetic field intensity. An external O-ring 66 and its corresponding external O-ring groove 68 preferably provide a means for sealing against fluid or gas migration around the outside of the sensor assembly 10.

Mounting bracket 24 provides a means for applying an axial force against the support structure 23 parallel to the sensor path 45 to hold the sensor assembly 10 firmly in position when a mounting bolt 70 is inserted through bracket hole 71 and mated with the mounting hole 56 in the mounting surface 58. Mounting bracket 24 also enables orienting the angular position of the sensor assembly 10 to ensure that the sensor 30 is properly aligned with the passing gear teeth 16 or splines.

During the installation of the sensor assembly 10, the sensor housing 22 is initially extended from the support structure 23 to an initial position. A temporary axial force, attributable to engagement of sensor housing 22 against gear tooth 16', is sufficient to overcome the frictional forces of the internal O-ring 48 and/or the ribs or ridges 50 against the sensor housing 22. As a consequence of the mechanical advantage of the threading of mounting bolt 70, sensor housing 22 is moved to a first (coarse) operational position. In the event that the size of the teeth 16 are sufficiently uniform, the first operational position is its final operational position. However, in the event of runout of the gear teeth 16, i.e., tolerance variations in the height of teeth 16, the highest tooth will, during the first rotation of the gear 14, exert an axial force against sensor housing 22 to position the sensing face 12 at a second or final operational position. Thereafter, the sensor housing 22 will be held in position by the frictional forces of the internal O-ring 48 and/or ribs or ridges 50 against the sensor housing 22. This position will minimize the airgap between the sensing face 12 and the highest target surface.

Figure 7:
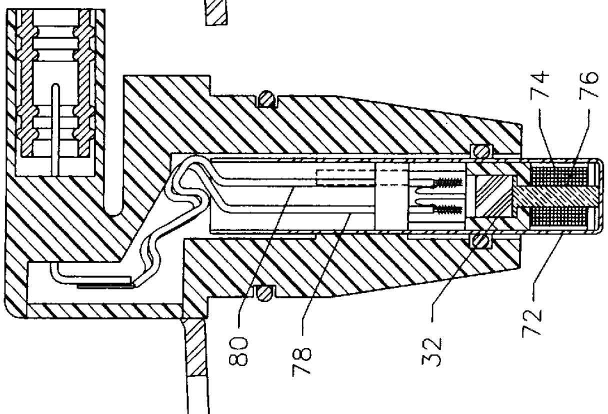
FIG. 7 is a sectional view of an alternative embodiment using a variable reluctance sensor assembly in place of the Hall-effect sensor of FIGS. 2–6.

Referring now to FIG. 7, an alternate embodiment of the present invention is shown which is substantially similar to the sensor shown in FIGS. 2–6, except that the sensor 30 comprises a variable reluctance sensor 72. The operation of an exemplary embodiment of the variable reluctance sensor 72 is described in detail in U.S. Pat. No. 5,278,496. In particular, the variable reluctance sensor 72 is primarily comprised of 1) a solenoid coil 74 and optionally 2) a polepiece 76 (preferably made of soft magnetic material inside the solenoid coil 74). Since the output signal of the variable reluctance sensor 72 is self-generating, there are usually only two conductors 78 and 80 that are required. Moreover, inasmuch as the radial alignment of the variable reluctance sensor 72 sometimes does not affect the sensor operation, the groove 52 and guide 54 may be eliminated on those occasions.

Figure 8:
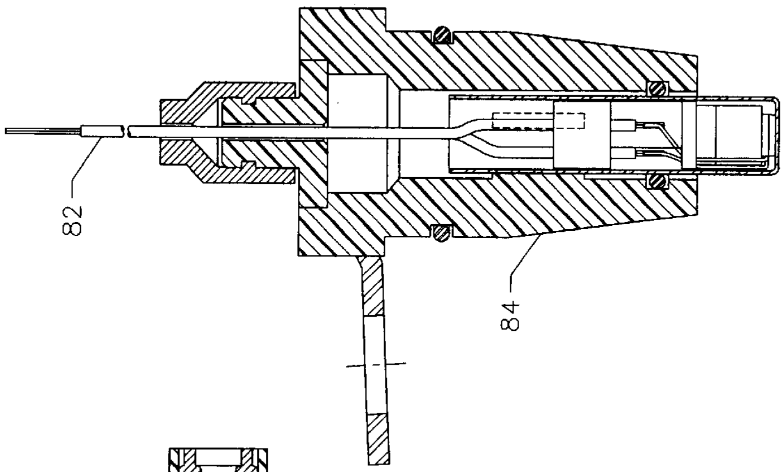
FIG. 8 is a sectional view of an alternative implementation of the sensors shown in FIGS. 2–7 showing a cable replacing the electrical connector.

Referring now to FIG. 8, another implementation is shown in which the connector 26 is replaced by a cable 82. This implementation, a so-called "leaded sensor" 84, is similar to the sensors shown previously, except that leads are used in place of the connector 26.

In a typical prior art sensor installation, a variation in the nominal distance from the sensor mounting surface 58 to the nominal surface of the moving target of up to 0.060 inches can be expected due to mounting tolerances. Additionally, there is typically 0.020 inches of runout. Consequently, there can be a variation from one installation to another of up to 0.080 inches between the actual sensing surface 12 and the actual surface 13 of the moving target 14. A prior art sensor using large-toothed gears, (e.g., 8-DP gears having teeth with face surfaces of about 0.140 inches and a gap of approximately 0.280 inches between the teeth), can typically sense gear teeth at this 0.080 inch distance since the gear teeth 16 are large in relationship to this 0.080 inch airgap. Inasmuch as magnetic fields decline in an exponential manner, it is typically difficult to sense teeth when the airgap is over approximately 0.025 inches. Therefore, since small-toothed gears, (e.g., 32-DP gears having teeth with face surfaces of about 0.033 inches and a gap of approximately 0.067 inches between the teeth) are relatively small in relationship to this 0.080 inch airgap, it is typically difficult for a prior art sensor to reliably sense small-toothed gears. Therefore, the ability of embodiments of the invention to minimize the airgap below 0.080 inches is especially significant for improving the reliability to sense such small-toothed gears.

It will be appreciated that the foregoing is presented by way of illustration only, and not by way of any limitation, and that various alternatives and modifications may be made to the illustrated embodiment without departing from the spirit and scope of the invention. The invention is capable of being practiced in various different embodiments, such as a reed switch, capacitive sensor, ultrasound sensor, optical sensor, or the like in place of the Hall-effect sensor, all of which are intended to be within the scope of the appended claims. Additionally, the invention is capable of being practiced for other distance measuring devices, such as proximity sensors, which are also intended to be within the scope of the appended claims. Moreover, other means such as a bellows can be used to provide for an adjustable seal, and means other than O-rings or raised ribs can be used for applying a restrictive, e.g., frictional, force without departing from the spirit and scope of the invention. Additionally, other means, such as threads on the outer surface of the support structure, can used to provide the axial force in place of the bolt and bracket.

We claim:

1. A sensor apparatus, intended for mounting proximate to a target surface with minimal airgap therebetween, for sensing the speed of said target surface moving along a defined target path, said apparatus comprising:

a support structure defining a substantially closed guideway open at a first end;

a sensor housing in said guideway projecting out of said open first end and supported for linear movement along said guideway between an initial position, a coarse operational position, and a final operational position;

a sensor mounted in said sensor housing;

at least one friction element acting in said guideway to produce a friction force acting on said sensor housing to resist movement and maintain the position of said sensor housing along said guideway; and an adjustable fastener for rigidly mounting said support structure to locate said sensor housing proximate to said target path, said fastener configured to produce an axial installation force on said support structure substantially parallel to said guideway for forcing said sensor housing against said target surface to displace said sensor housing to said coarse operational position whereat runout of said target surface will produce an axial force on said sensor housing to overcome said friction force and displace said sensor housing to said final operational position.

2. The sensor apparatus of claim 1 further including a fixed mounting surface; and wherein said fastener comprises a bolt threaded relative to said mounting surface for producing said axial installation force on said support structure.

3. The sensor apparatus of claim 1 wherein said friction element comprises an O-ring mounted in said guideway for peripherally engaging said sensor housing.

4. The sensor apparatus of claim 1 wherein said guideway is defined by a peripheral wall; and wherein said friction element comprises a ribbed member protruding inwardly from said peripheral wall for engaging said sensor housing.

5. The sensor apparatus of claim 1 wherein said target surface is formed of a ferrous material and said sensor housing includes a magnetic sensor capable of sensing said ferrous material.

6. The apparatus of claim 5 wherein said magnetic sensor is a Hall-effect sensor.

7. The apparatus of claim 5 wherein said magnetic sensor is a variable reluctance sensor.

8. A method of adjusting the position of a sensor adjacent to a target surface to minimize the air gap therebetween, said method comprising the steps of:

fixedly mounting said sensor in a protective sensor housing;

providing a support structure having a guideway defining an axial sensor path;

mounting said sensor housing for linear movement along said sensor path between an initial position and a final operational position;

applying a friction force to said sensor housing for resisting movement along said sensor path;

mounting said support structure to position said sensor housing proximate to said target surface;

applying a first installation force to said support structure for engaging said sensor housing against said target surface to overcome said friction force and move said sensor housing from an initial position to a coarse operational position; and moving said target surface while engaged by said sensor housing whereby target surface runout will produce an axial force on said sensor housing sufficient to overcome said friction force to adjust the position of said sensor housing from said coarse operational position to a final operational position.

9. The method of claim 8 wherein said step of applying a first installation force includes a step of threading a bolt oriented parallel to said axial sensor path and bearing against said support structure.

* * * * *